United States Patent
Strolle et al.

[11] Patent Number: 5,430,497
[45] Date of Patent: Jul. 4, 1995

[54] REMOVAL OF THE FOLDING CARRIER AND SIDEBANDS FROM AN UNFOLDED VIDEO SIGNAL

[75] Inventors: Christopher H. Strolle, Glenside, Pa.; Jung-Wan Ko, Suwon, Rep. of Korea; Raymond A. Schnitzler, Piscataway, N.J.

[73] Assignee: SamSung Electronics Co., Ltd., Kyungki-do, Rep. of Korea

[21] Appl. No.: 562,907

[22] Filed: Aug. 6, 1990

[51] Int. Cl.⁶ .................................................. H04N 7/00
[52] U.S. Cl. ........................................ 348/607; 348/571
[58] Field of Search ................ 358/168, 31, 138, 11, 358/12, 141, 355, 310, 329; 382/22, 27, 28; H04N 7/00, 5/91, 11/00, 11/02; 348/427, 430, 431, 571, 607

[56] References Cited

U.S. PATENT DOCUMENTS

| | | | |
|---|---|---|---|
| 4,178,609 | 12/1979 | Beutel. | |
| 4,498,009 | 2/1985 | Pritchard. | |
| 4,498,100 | 2/1985 | Bunting et al. | |
| 4,597,009 | 6/1986 | Reitmeier et al. | 358/31 |
| 4,641,180 | 2/1987 | Richter. | |
| 4,695,885 | 9/1987 | Kim | 358/168 |
| 4,772,961 | 9/1988 | Ichinoi. | |
| 4,819,062 | 4/1989 | Dongil et al. | 358/31 |
| 4,831,463 | 5/1989 | Faroudja | 358/138 |
| 4,870,481 | 9/1989 | Kawamata | 358/31 |
| 4,962,542 | 10/1990 | Klees | 382/27 |
| 4,992,856 | 2/1991 | Robinson | 358/31 |
| 5,101,440 | 3/1992 | Watanabe et al. | 382/22 |

FOREIGN PATENT DOCUMENTS

| | | | |
|---|---|---|---|
| 0149214 | 7/1985 | European Pat. Off. | 358/31 |
| 0321045 | 6/1989 | European Pat. Off. | |
| 0139090 | 7/1985 | Japan | 358/31 |
| 0041290 | 2/1986 | Japan | H04N 978 |
| 0013185 | 1/1987 | Japan | 358/138 |
| 2112246 | 7/1983 | United Kingdom. | |

OTHER PUBLICATIONS

Couturier, Guy D. "Sobel Edge Extraction Circuit" Air Force technical disclosure May 1981.
Patent Abstract of Japan, vol. 11, No. 209, (E-521), 7 Jul. 1987, JP-A-62-029,392.

*Primary Examiner*—James J. Groody
*Assistant Examiner*—David E. Harvey
*Attorney, Agent, or Firm*—Robert E. Bushnell

[57] ABSTRACT

Apparatus is disclosed for processing video information which is reproduced from a magnetic recording medium in a video cassette recorder. The luminance portion of the video signal, which is "folded" about a sampling frequency carrier before recording on magnetic tape, is unfolded after being read from the magnetic tape to restore the bandwidth of the signal, and is applied in parallel through horizontal and vertical comb filters. The combined output of the horizontal comb filter and the vertical comb filter may include incompletely cancelled horizontal and vertical components of the folding frequency and sidebands due to the effects of picture contents. An edge detector receptive to the unfolded video signal responds to an encountered brightness edge, and generates a signal which varies the proportions of the video outputs of the horizontal and vertical comb filters in the combined output.

57 Claims, 5 Drawing Sheets

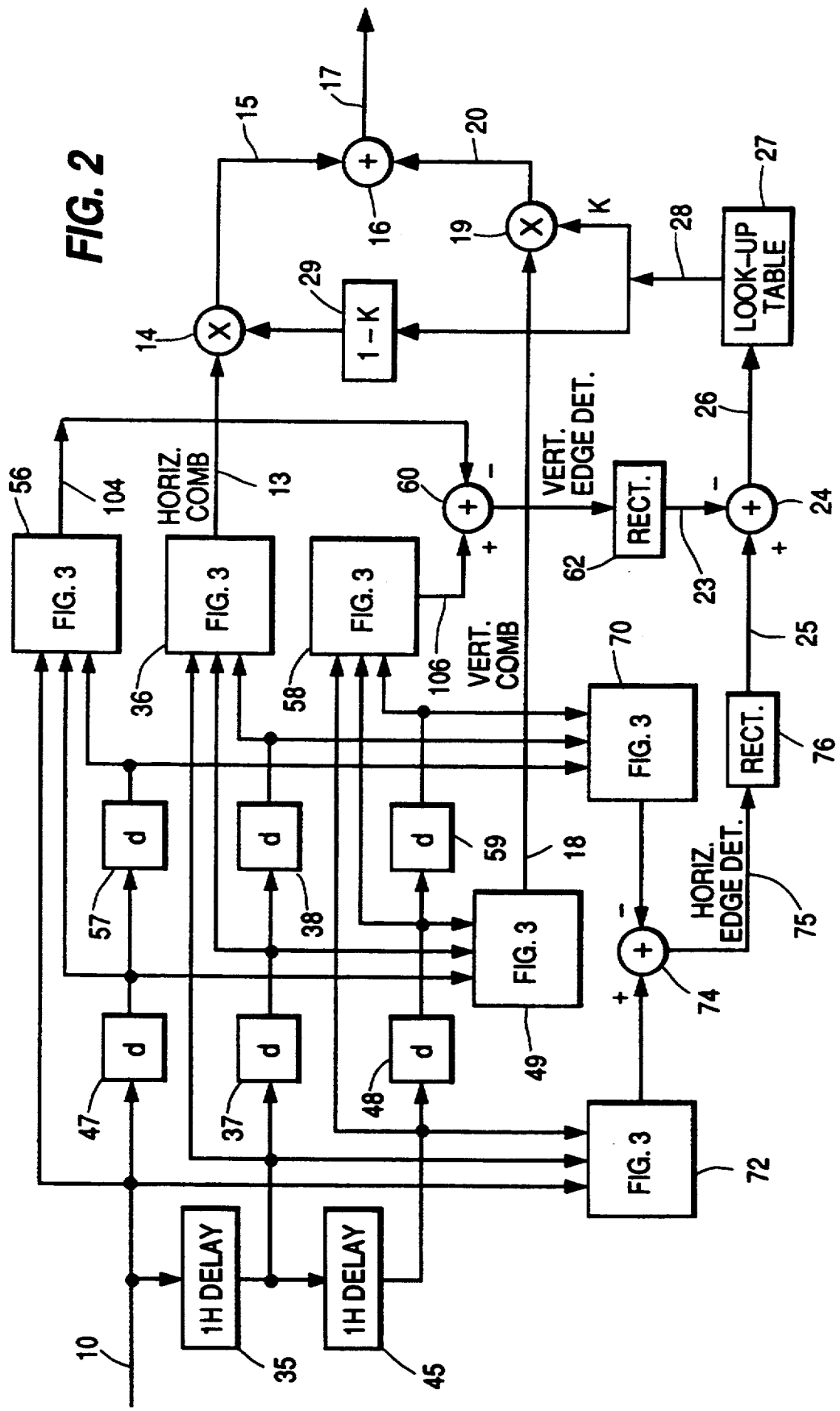

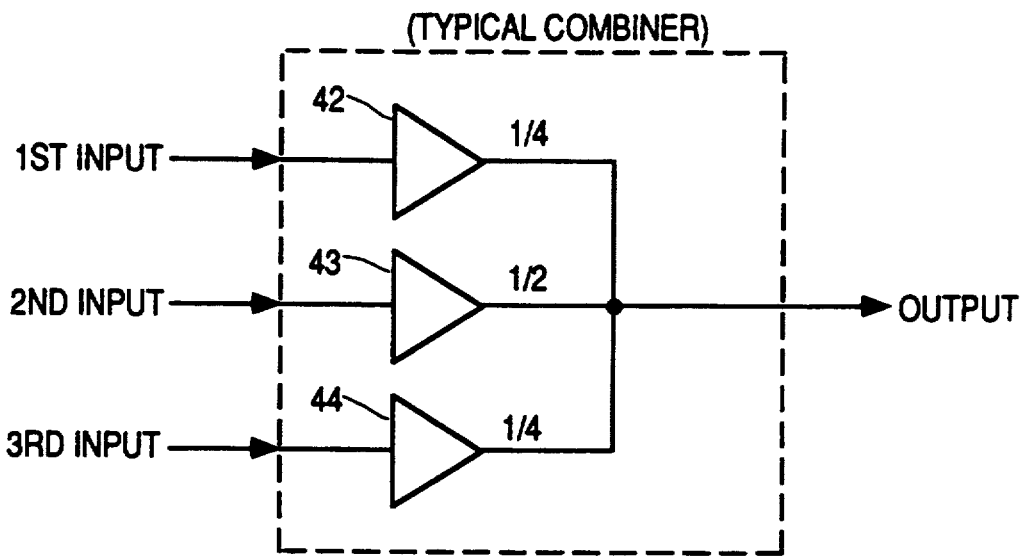
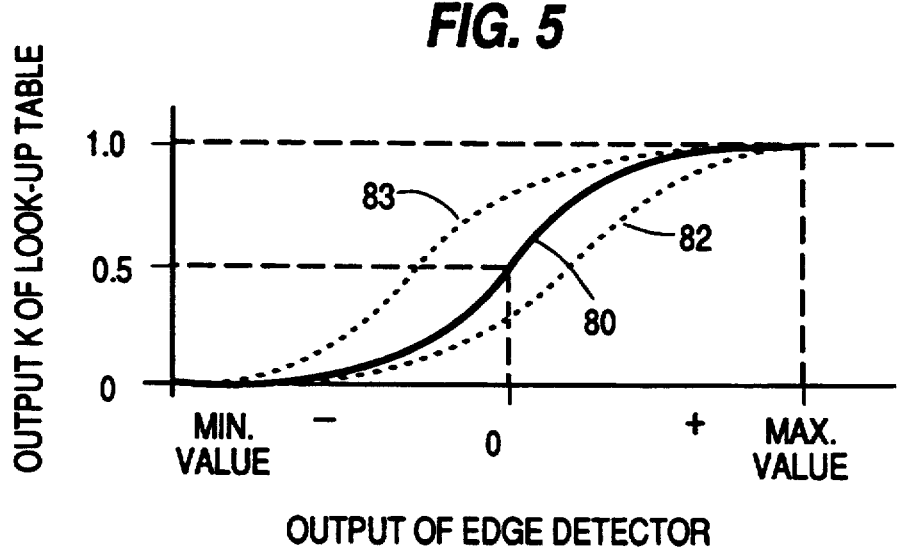

REMOVAL OF THE FOLDING CARRIER AND SIDEBANDS FROM AN UNFOLDED VIDEO SIGNAL

FIELD OF THE INVENTION

The present invention relates to television signal processing methods and apparatus. More particularly, the present invention relates to the folding of luminance high frequency components into a mid-band spectrum prior to recording on a magnetic medium, and thereafter unfolding and restoring the luminance high frequency components. The unfolded luminance signal is passed through comb filters to attenuate the horizontal component and the vertical component of the sampling frequency which results from the digital sampling process. The attenuation of the sampling frequency components is imperfect, because it is affected by the subject matter of the scanned picture.

BACKGROUND OF THE INVENTION

Broadcast television signals according to the NTSC standard in the U.S.A. occupy a video frequency band of about 4.25 MHz. Low cost home video cassette recorders are unable to record a TV signal having so wide a frequency range on magnetic tape and may be limited to recording a frequency range of about 2.5 MHz Accordingly, the definition of pictures reproduced by a video cassette recorder is considerably less than is produced by a TV set receptive of an over-the-air signal. A great deal of effort has been directed to improving the definition of pictures reproduced by a video cassette recorder, in spite of the frequency limitation of the magnetic recording process. For example, it is known to improve the definition of magnetically recorded images by folding the high frequency components, of the luminance portion of a TV signal to be recorded, into a base-band spectrum, and thereafter, unfolding and restoring the luminance high frequency components for combination with the chroma signal and reproduction in a TV set.

In processing video signals after they have been unfolded from the folded condition, the modulation carrier and the corresponding sidebands are not always removed completely. The effect of the incomplete removal of these signals is artifacts or blemishes in the final TV picture display. These artifacts are particularly evident when the object has a well-defined edge which the luminance signal (particularly in the upper bandwidths, about 4.5 MHz) can reproduce. The problem of removing these unwanted signals has heretofore been difficult to accomplish. It is important to understand the folding and unfolding processes in order to appreciate how the present invention overcomes the problem of the unwanted signals.

The folding and unfolding process involves the use of comb filters well known in the art. Thus, when an object or field of view is periodically scanned in a series of parallel lines and the light level variations are translated into electrical energy analogs, the energy is largely concentrated in a number of discrete energy groups distributed throughout the spectrum used. There is very little useful energy lying between the groups, and the spectral distance between the groups is related to the line scanning rate and the picture frame scanning rate. Most of the energy lies at the line scanning rate and harmonics thereof, and at the frame scanning rate and harmonics thereof. Comb filters are used in processing the video when folding the high frequency discrete energy groups into the spaces between the low frequency discrete energy groups, and in processing the video when unfolding the high frequency and low frequency energy groups.

A horizontal comb filter in a digitized video system includes in cascade connection two delay devices each with a delay t, where t is the delay time between picture elements (pixels), which may be the period of a $f_{sh}$ horizontal sampling carrier. The luminance signal before entering the first delay device, the signal leaving the first delay device, and the signal leaving the second delay device are combined in such a way as to tend to cancel the horizontal folding frequency carrier at the output of the horizontal comb filter.

Similarly, a vertical comb filter in a digitized video system includes in cascade connection two delay devices each with a delay of the delay time between successive lines, which may be the period of $f_{sv}$, the vertical sampling frequency, where $f_{sv}$ is equal to $f_{sh}$ divided by pixels per line. The luminance signal before entering the first delay device, the signal leaving the first delay device, and the signal leaving the second delay device are combined in such a way as to tend to cancel the vertical component of the folding frequency and sidebands at the output of the vertical comb filter.

However, the completeness of cancellation of the horizontal frequency component, and of the vertical frequency component, is affected by the subject matter being scanned. The horizontal frequency cancellation is the best when the pixels scanned horizontally have the same brightness. And the vertical frequency cancellation is the best when the pixels scanned vertically have the same brightness. In both cases, the cancellation is the poorest when horizontally scanning a "horizontal edge" between white and black, and when vertically scanning a "vertical edge" between white and black.

According to the terminology employed herein, a horizontal scan encountering an edge between white and black is said to encounter a "horizontal edge" The edge may be a vertical line, but it is called a horizontal edge because it is encountered during a horizontal scan. Similarly, an edge encountered during a vertical scan is called a "vertical edge". The term "edge" is sometimes referred to in the art as a "discontinuity", "transition", or "detail".

SUMMARY OF THE INVENTION

According to the invention, apparatus is provided to improve the extent to which the horizontal and vertical components of the sampling carrier are cancelled in the combined outputs of horizontal and vertical comb filters, both of which are receptive to an unfolded video signal. The outputs of the horizontal and vertical comb filters are combined in a proportion determined by the output of edge detector means which may include a look-up table.

BRIEF DESCRIPTION OF THE DRAWING

FIG. 2 is a more detailed schematic diagram of the embodiment of the invention shown in FIG. 1, FIG. 3 is a schematic diagram of a typical combiner circuit included in the blocks labeled FIG. 3 in FIG. 2, FIG. 5 is a diagram which will be referred to in describing the look-up table in FIG. 1.

DETAILED DESCRIPTION OF PREFERRED EMBODIMENTS

Figure 1:
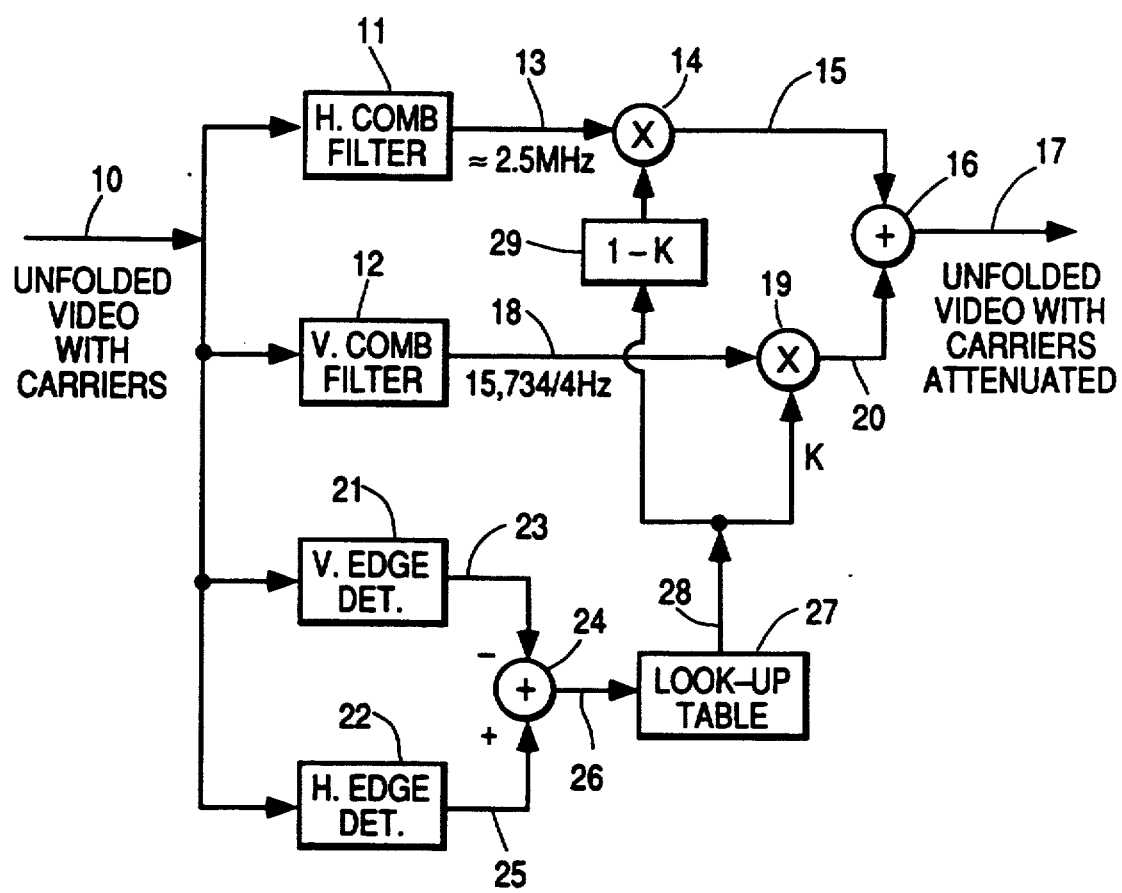
FIG. 1 is a functional diagram illustrating one embodiment of the invention in which the outputs of horizontal and vertical comb filters are controlled by the outputs of vertical and horizontal edge detectors.

Reference is now made to FIG. 1 for a general simplified description of one embodiment of the invention. An input line 10 carries an unfolded video signal including a sampling carrier with sidebands and having horizontal and vertical components. This video signal is produced in the playback portion of a video cassette recorder (VCR) of the type in which the high frequencies of the luminance signal are folded over and interleaved with the low frequencies for recording, and are unfolded for playback. The input video signal is applied to a horizontal comb filter 11 and a vertical comb filter 12, in parallel. The output of the horizontal comb filter 11 on line 13 is applied to a first input of a multiplier 14 having an output 15 applied to one input of an adder 16, in turn, having an output 17. The output of the vertical comb filter 12 on line 18 is applied to one input of a multiplier 19 having an output 20 to a second input of the adder 16.

The input unfolded video signal on line 10 is also applied to a vertical scan edge detector 21 and a horizontal scan edge detector 22. The output on line 23 from the vertical edge detector 21 is applied to the minus or negative input of subtracter 24, and the output on line 25 from the horizontal edge filter 22 is applied to the plus or positive input of subtracter 24. The output of subtracter 24 on line 26 is applied as input address signal to the input of a read-only memory (ROM) 27 storing values of output signal as a look-up table This read-only memory 27 storing values of output signal as a look-up table is simply referred to as 'look-up table 27' in the remainder of this specification. An output signal K from the look-up table on line 28 is applied into a second parallel input of the multiplier 19, and through a 1−K circuit 29 to a second input of the multiplier 14.

In the operation of the circuit shown in FIG. 1, equal amplitudes of the unfolded video signal on input line 10 are passed through the horizontal comb filter 11 and the vertical comb filter 12, and, unless affected by multipliers 14 and 19, equal amplitudes of the two signals are combined in adder 16 and the sum is available at the output 17. The horizontal comb filter 11 is designed, as will be described, to cancel the sidebands of the folding carrier at or above 2.5 MHz, and the vertical comb filter 12 is designed to cancel the line frequency of 15,734 Hz. However, the cancellations of the carrier and sidebands may be incomplete since they are affected by the brightness variations in the picture being scanned.

Cancellations of the horizontal and vertical carriers on the output line 17 is achieved by the operation of the vertical scan edge detector 21 and the horizontal scan edge detector 22. When a "vertical" edge or discontinuity is detected during a vertical scan, a signal over line 23 and through subtracter 24 to the look-up table 27 causes a signal over line 28 from look-up table 27 to increase the proportion of the output at 17 from the horizontal comb filter 11, whose output is not affected by the vertical edge, and decrease the proportion from the vertical comb filter 12. Likewise, when a "horizontal" edge is detected during a horizontal scan, a signal over line 25 and through subtractor 24 causes a signal over line 28 both to increase the proportion of the output at 17 from the vertical comb filter 12, whose output is not affected by the horizontal edge, and decrease the proportion from the horizontal comb filter 11. In each case, the cancellation of carrier components is improved according to the invention by increasing the output proportion from the comb filter whose output is not affected by the brightness edge encountered.

Reference is now made to FIG. 2 for a description in which the comb filters and edge detectors of the embodiment of the invention shown in FIG. 1 are shown in greater detail. FIG. 2 is an implementation of the functional circuit of FIG. 1 in which the comb filters 11 and 12 and the edge detectors 21 and 22 are represented as independent structures. However, in the preferred embodiment of FIG. 2 some of the components serve in both vertical and horizontal signal processing functions. For that reason, the functions of the respective blocks 11, 12, 21, and 22 of FIG. 1 would be unnecessarily complicated to delineate in FIG. 2, noting that the function of each are, indeed, being performed by the circuit of FIG. 2 as will now be described.

The input unfolded video signal on line 10 (FIG. 2) is applied through a 1 H delay device 35 (providing the delay between horizontal lines) to a first input of a combining circuit 36, and also through a pixel delay (d) device 37 to a second input of the circuit 36, and from there through a second pixel delay device 38 to a third input of the combining circuit 36. The combining circuit 36 is constructed as shown in FIG. 3 as an adder to include amplifiers 42, 43 and 44, in which one-fourth of the output amplitude is provided by amplifier 42, one-half is provided by amplifier 43 and one-fourth is provided by amplifier 44. FIG. 3 is a typical combiner used in FIG. 2 as indicated. The elements of FIG. 2 just described constitute a horizontal comb filter implementing filter 11 of FIG. 1, having an input on line 10 and an output on line 13 going through mixer 14 and adder 16 to the unfolded video output line 17.

The operation of the horizontal comb filter portion of FIG. 2 will be described with reference to the spatial diagram of FIG. 4, which shows both horizontal and vertical folding carrier waveform components in relation to a pixel array. At an instant of time, the signal inputs to combining circuit 36 may comprise a signal from the input to delay device 37 representing pixel d, and a signal from between delay devices 37 and 38 representing the pixel e, and a signal from the output of delay device 38 representing the pixel f. The horizontal component signal levels corresponding with pixels d, e and f are, in sequence, negative, positive and negative. The combining circuit 36 produces an output signal, in sequence, one-fourth negative, plus one-half positive, plus one-fourth negative, which sums to a value of zero. Therefore, the horizontal carrier frequency components at the output 13 of the horizontal comb filter tend to be zero.

However, the output 13 of the horizontal comb filter includes all the many frequencies of the unfolded video signal from the input line 10. Moreover, the various frequencies have amplitudes determined by picture content, that is, by whether pixels d, e and f have the same brightness, or different brightnesses. Therefore, according to the invention, as stated previously, the proportion of the output of the horizontal comb filter which reaches the output line 17 is modified in accordance with brightness variations in the picture.

The vertical comb filter implementing the filter 12 of FIG. 1 is comprised of 1 H delay devices 35 and 45, each delaying the input on line 10 by the delay between successive horizontal scan lines, and by pixel delay devices 47, 37 and 48, and also by combining circuit 49. The vertical comb filter operation of FIG. 2 will be described with reference to FIG. 4 also showing a vertical carrier component in relation to the array of pixels. At an instant of time, the signal input to combining circuit 49 may be a signal from the output of pixel delay device 48 representing a pixel h, and signal from the output of pixel delay device 37 representing a pixel e, and a signal from pixel delay device 47 representing a scanned pixel b.

The combining circuit 49 produces an output containing one-fourth contributions from two negative half cycles of the vertical carrier, and a one-half contribution from one positive half cycle. The vertical carrier thus is cancelled in the signal applied over line 18 and through multiplier 19 and adder 16 to the signal output line 17. However, many picture dependent frequencies of the input folded video signal are also present in the output of the vertical comb filter. Consequently, the proportion of the signal output at 17 from the output of the comb filter is modified by means to be described.

A vertical scan edge or transition detector implementing the detector 21 of FIG. 1 includes a pre-filter combining circuit 56 having one input from signal input line 10, a second input from the output of pixel delay device 47 and a third input from the output of pixel delay device 57. The vertical scan edge detector also includes a pre-filter combining circuit 58 receptive to a first input from series-connected 1 H delay devices 35 and 45 to a second input from the output of pixel delay device 48, and a third input from the output of pixel delay device 59. The respective outputs 104 and 106 of pre-filter combining circuits 56 and 58 are combined in a subtractor 60 and full-wave rectified in rectifier 62 to provide a signal on line 23 which is independent of polarity and which is applied to one input of the subtractor 24.

A horizontal scan edge detector includes a pre-filter combining circuit 70 having inputs from the outputs of delay devices 57, 38 and 59, and having an output connected to a subtractor circuit 74. The horizontal scan edge detector also includes a pre-filter combining circuit 72 having inputs from input line 10, the output of delay device 35 and the output of delay device 45, and having an output connected to the subtractor 74. The output of subtractor 74 is full-wave rectified in rectifier 76 to provide a signal on line 25 which is independent of polarity and which is applied to the other input of the subtractor 24.

The output of subtractor 24 on line 26 is applied to a look-up table 27 having an input/output characteristic as shown in FIG. 5. An input signal on line 26 having a value between a minimum or negative value and a maximum or positive value produces a look-up table output signal having a value between 0 and 1. The conversion may be in accordance with a curve 80, which is arrived at experimentally as one which produces the best cancellation of the horizontal and vertical carders. However, other shapes such as curve 82 or curve 83 of the characteristic curve may be found to produce a better result for a particular design objective.

The unit 24 as described above as a subtractor for one embodiment is used to subtract the output (23) of the vertical edge detector from the output (25) of the horizontal edge detector to produce a difference signal for application to the look-up table 27. Alternatively, the unit 24 may be embodied as a divider or ratio detector which determines the ratio of the output 23 of the vertical edge detector to the output 25 of the horizontal edge detector. In this alternative embodiment, the look-up table 27 will be designed to respond to a ratio signal input and produce an appropriate output signal K.

Figure 4:
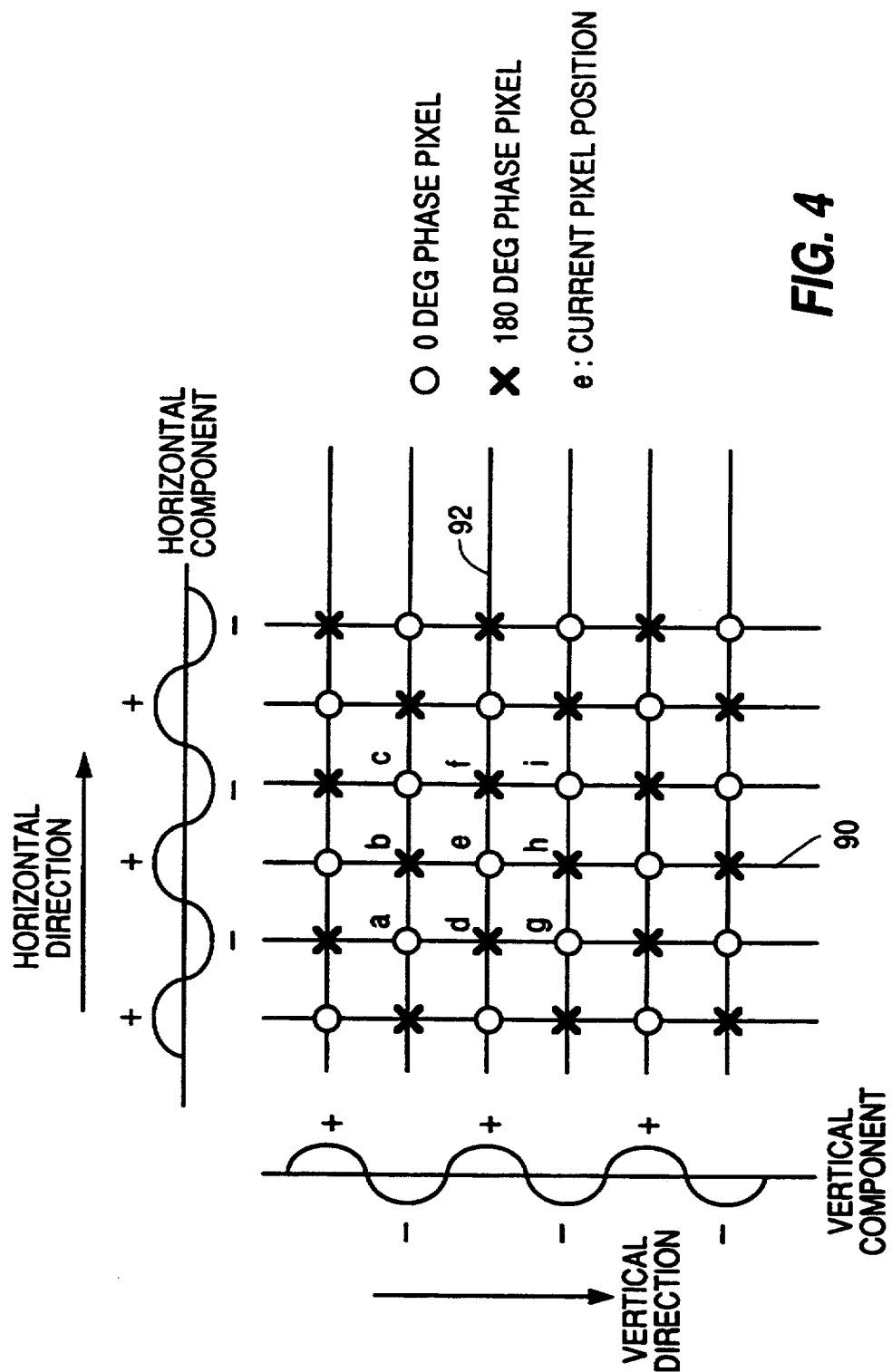
FIG. 4 is a spatial diagram showing picture elements (pixels) in relation to horizontal and vertical carrier waves.

In the operation of the horizontal and vertical edge detectors, assume that there is a brightness edge between white and black along a vertical line 90 in FIG. 4 which includes pixels b, e and h. The vertical scan detector does not encounter an edge during a vertical scan, (but the horizontal scan detector does encounter an edge during the horizontal scan.) The vertical scan edge detector includes the pre-filter combining circuit 56 which receives signals representing a white pixel a, a mixed pixel b and a black pixel c, which adds up to a grey value signal. Also, the pre-filter combining circuit 58 receives similar signals representing a white pixel g, a grey pixel h and a black pixel i, which also adds up to a grey mid value signal. The two grey value signals are subtracted in subtractor 60 to produce a very low value difference signal applied through full wave rectifier 62 to subtractor 24. This low value signal from the vertical edge detector has little or no effect on the output at 26 of the subtractor 24.

The foregoing operation occurs as described because the pre-filter combining circuits 56 and 58 act as low-pass filters which attenuate the vertical component of the folding carrier to the −6 dB value. Therefore, the pre-filter combining circuit adds up the large and small video signals corresponding with white and black pixels, and ignores the alternating polarities of the folding carrier component of adjacent pixels. It should also be noted that the subtractor 60 constitutes a band-pass filter for the vertical edge detection signal, passing signals about the 2.5 MHz value. This frequency is detected in the edge (not present in the foregoing example) between a row of pixels a, b and c; and a row of pixels g, h and i; in FIG. 4.

In the example of a brightness edge between white and black along a vertical line 90 in FIG. 4, the output 25 of the horizontal scan edge detector does have a large effect on the output of subtractor 24. The pre-filter combining circuit 70 in the horizontal scan edge detector receives signals from the outputs of delay devices 57, 38 and 59 corresponding with black pixels c, f and i having a low total value, and pre-filter combining circuit 72 receives signals from the input 10 and from the outputs of delay devices 35 and 45 corresponding with white pixels a, d and g having a relatively high total value. The output of pre-filter combining circuit 70 is subtracted from the high output of pre-filter combining circuit 72 in subtractor 74 to produce a positive output signal. (It will be noted that the output of subtractor 74 would be a negative signal if the brightness edge had been from dark to light.)

Here again, the pre-filter combining circuits 70 and 72 act as low-pass filters effectively cancelling the folding carrier component in the output of the pre-filter combining circuits and preventing the generation of false edge signals, and allowing the generation of edge signals when an edge actually exists. For example, in the foregoing description, circuit 72 receives signals representing white pixels a, d and g having a high total value. But pixel d has a different polarity from pixels a and g in the half cycles of the folding carrier, so that the sum of signals from pixels a, d and g would be low and would result in a false indication of no edge if the folding carrier were not cancelled by the pre-filter combining circuit 72.

And, here again, it should be noted that subtractor 74 constitutes a band-pass filter for the horizontal edge detection signal, passing signals about the 2.5 MHz value. This frequency is detected in the white-black edge along line 90 in FIG. 4 between pixels a, d and g on one side, and c, f and i on the other side.

The positive output of subtractor 74 is passed on line 75 through a full-wave rectifier 76, to produce a positive output at 25, regardless of whether the input signal is negative or positive, and on to subtractor 24 which produces a large positive signal at the input of look-up table 27 and thus a $K=1$ signal at the output 28. As a result, the video signal from the vertical comb filter is passed through mixer 19 and adder 16 to the output line 17. Thus, the output from the $1-K$ circuit is $1-1=0$ which is then applied to mixer 14 to block any output from the horizontal comb filter that would otherwise have been applied through adder 16 to signal output line 17.

Stated another way, the edge detectors of FIG. 2 affect the proportions of the respective outputs of the horizontal comb filter and the vertical comb filter which appear at the signal output line 17. In the example described, the proportion is 100% from the vertical comb filter and 0% from the horizontal comb filter. The proportion from the output of the horizontal comb filter should be zero, it will be appreciated, because it includes disturbances or perturbations due to scanning across a white-black or black-white brightness edge.

In the case of scanning across a light-grey-to-dark-grey edge, the edge detectors will produce signals which make the output signal include, say, for example, 75% from the vertical comb filter and 25% from the horizontal comb filter. If them is no brightness edge, the proportions will be 50% from the vertical comb filter and 50% from the horizontal comb filter.

The operation of the edge detectors will now be described for the condition in which there is a white-black edge encountered during a vertical direction scan across a line 92 through pixels d, e and f, with white above the line and black below the line. The horizontal scan edge detector produces a very small signal because the pre-filter combining circuits 70 and 72 receive cancelling signals from white and black pixels. That is, circuit 70 receives a signal from delay device 57 representing white pixel c, a mixed signal from delay device 38 representing a mixed brightness pixel f, and a signal from delay device 59 representing a black pixel i. And, circuit 72 receives a signal from delay device 47 representing white pixel a, a mixed signal from delay device 37 representing a mixed pixel d, and a signal from delay device 48 representing a black pixel g. The equal signals from circuits 70 and 72 are cancelled in subtractor 74.

The vertical scan edge detector produces a large signal output from subtractor 60 because the pre-filter combining circuit 56 receives large signals from input 10, delay device 47 and delay device 57 representing white pixels a, b and c, and pre-filter combining circuit 58 receives small signals from delay devices 45, 48 and 59 representing black pixels g, h and i. The difference is a large signal applied through rectifier 62 to subtractor 24, which produces a large negative signal applied over line 26 to look-up table 27. The output of table 27 is $K=0$, which is applied to mixer 19 to block the video signal from the vertical comb filter, and a $1-K=1$ signal from circuit 29 is applied to mixer 14 to pass the video signal from the horizontal comb filter through to adder 16 and thence to the video signal output line 17.

The operation of the horizontal and vertical edge filters is generally summarized as follows:

When scanning horizontally through a brightness edge which may be from light to dark, or from dark to light, the horizontal scan edge detector (22, FIG. 1) produces a positive output which causes a greater proportion of the video signal from the vertical comb filter (12, FIG. 1) to pass through to the video signal output, and a lesser proportion of the disturbed video signal from the horizontal comb filter (11, FIG. 1).

When scanning vertically through a brightness edge, the vertical scan edge detector (21, FIG. 1) produces a positive signal which, when translated to a negative signal by subtractor 24, causes a greater proportion of the video signal output (17) from the horizontal comb filter (11), and a lesser proportion of the disturbed video signal from the vertical comb filter (12).

In the just-described operation of the horizontal edge detector and the vertical edge detector, the false signal effects of the alternating polarity half cycles of the horizontal component are prevented by the low-pass pre-filters 70 and 72; and the corresponding false signal effects of the vertical component are prevented by the low-pass pre-filters 56 and 58. At the same time, the subtractor 74 acts as a band-pass filter for the $f_{sh}/4$ signals (for example, 2.5MH$_z$) from the horizontal edge detector, and the subtractor 60 acts as a band-pass filter for the $f_{sv}/4$ signal (for example, 3933.5 Hz) from the vertical edge detector.

Figure 6:
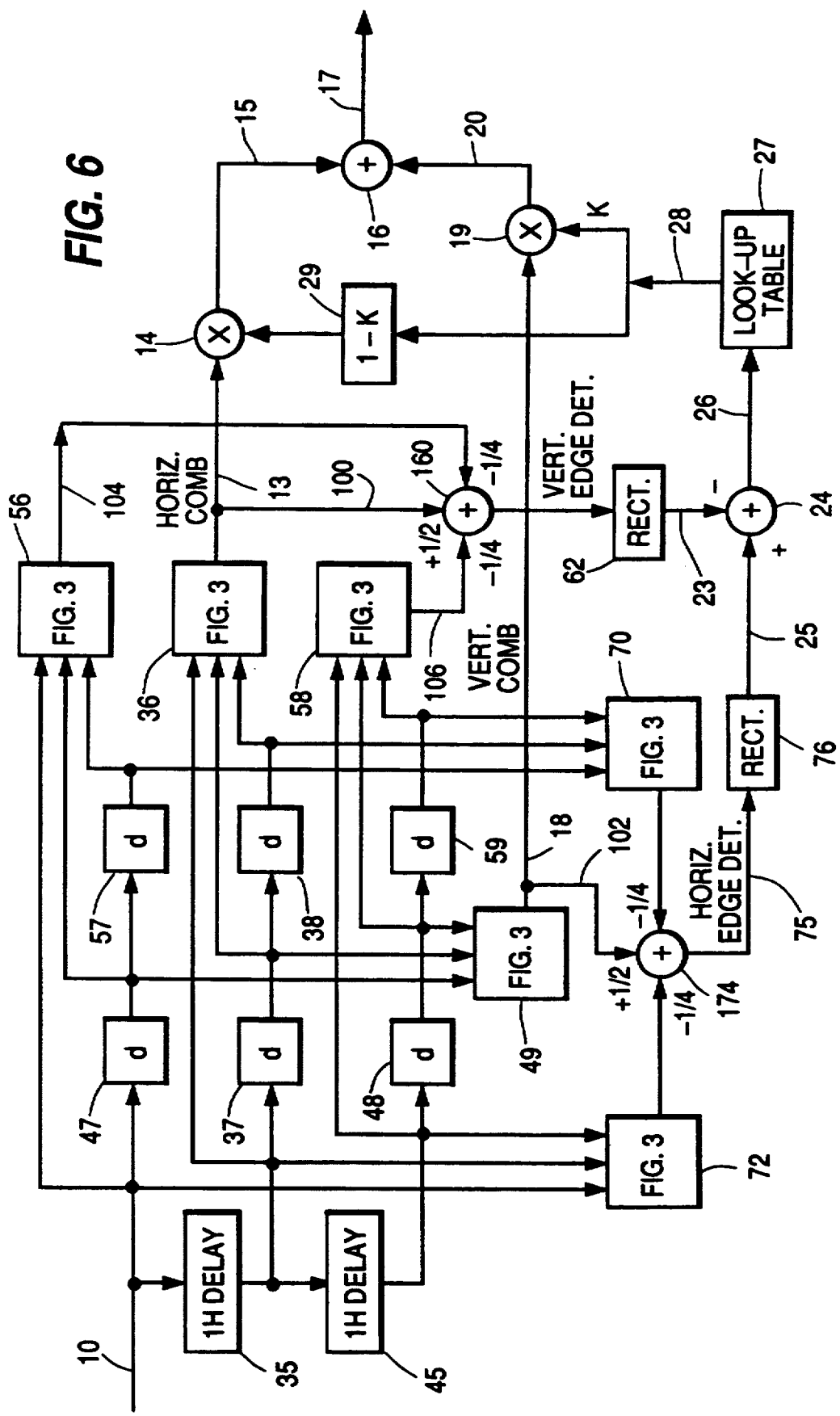
FIG. 6 is a schematic diagram of an embodiment of this invention which is a modification of the embodiment shown in FIG. 2.

Reference is now made to FIG. 6 for a description of a modification of the system of FIG. 2 wherein the same reference numerals are employed for the elements which are common to the two embodiments. In FIG. 6, the combining circuit 36 of the horizontal comb filter is additionally used as a pre-filter combining circuit providing a third input 100 to a combining circuit 160 from which is obtained the vertical edge detection signal. The combining circuit 160 is like the combining circuit of FIG. 3 in having three inputs. (For convenience, combining circuits 160 and 174 are shown in the same circular form as the original summers 60 and 74 in FIG. 4.) The combining circuit 160 receives the output on line 100 from combining circuit 36 with a weight of plus ½, and the outputs of pre-filter combining circuits 56 and 58 with weights of minus ¼ each.

The combining circuit 49 in the vertical comb filter is additionally used as a pre-filter combining circuit providing a third input on line 102 to a combining circuit 174 from which is obtained the horizontal edge detection signal. The combining circuit 174 receives the output on line 102 from combining circuit 49 with a weight of plus ½, and the outputs of pre-filter combining circuits 70 and 72 with weights of minus ¼ each.

The operation of the system of FIG. 6 is superior in some respects to that of FIG. 2 in that the edge detectors respond to sharper, closer white-black and black-white edges. This difference in operation results from the fact that the three-input combining circuit 160 in the vertical edge detector, and the three-input combining circuit 174 in the horizontal edge detector, are high-pass filters which pass a higher range of frequencies than the two-input combining circuits 60 and 74 in FIG. 2. The three-input combining circuits pass frequencies above $f_s/4$, while the two-input combining circuits pass frequencies in a range between $f_s/8$ and $3f_s/8$.

In the foregoing description of the operation of FIG. 2 it was shown that a horizontal scan along a line 92 in FIG. 4 of a white-black edge along a vertical line produced a large white signal for pixels a, d and g, and produced small black signals for pixels c, f and i. The result is the detection in subtractor 74 of an abrupt horizontal edge along a vertical line in FIG. 4 where pixels a, d and g are white, and pixels c, f and i are black.

Consider now the case where pixels a, d and g are white; pixels b, e and h are black; and pixels c, f and i are white. The system of FIG. 2 will not detect the white-black edge between white pixels a, d and g; and black pixels b, e and h; and will not detect black-white edge between black pixels b, e and h; and white pixels c, f and i. However, these high frequency white-black and black-white edges are detected by the system of FIG. 6 as follows.

In the described case where pixels a, d and g are white; and pixels b, e and h are black; and pixels c, f and i are white, the horizontal edge detector output is provided at 75 and 25 for the white-black-white edges between pixels a, d and g, and pixels c, f and i.

The combining circuit 72 receives high signals from line 10, and delay devices 35 and 45 representing white pixels a, d and g; the combining circuit 49 receives small signals from delay devices 47, 37 and 48 representing black pixels; and the combining circuit 70 receives high signals from delay devices 57, 38 and 59 representing white pixels. The high negative signal from combining circuit 72 and the low positive signal from combining circuit 49, and the high negative signal from combining circuit 174 to produce a large negative edge detection signal at its output 75, 25. The negative signal is translated to a positive signal by rectifier 76 and is applied over line 25 to subtractor 24. If the pixels were in the different order, black-white-black, the combining circuit 174 would produce a large positive signal on line 25. The rectifier 76 produces a positive edge detection signal regardless of whether the detected edges are white-black-white, or black-white-black.

The operation of the systems of FIG. 2 and FIG. 6 has been described in a subjective way with references to the pixel diagram of FIG. 4. The operation may also be viewed in terms of the theory of filters. In FIG. 2 the subtractor 74 performs the function: $y(n)=x(n+1)-x(n-1)$, which results in the detection of transition having a frequency range centered around $f_s/4$. In FIG. 6, however, the combining circuit 174 performs the function: $y(n)=\frac{1}{2}x(n)-\frac{1}{4}x(n+1)-\frac{1}{4}x(n-1)$, which results in the detection of sharper transitions or edges having a higher frequency range above $f_s/4$, and centered about $f_s/2$. In summary, the system of FIG. 2 detects edges spaced a larger amount, such as between pixels d and f in FIG. 4. The system of FIG. 6 detects edges more closely spaced, such as between pixels d and e, and between e and f, in FIG. 4.

In the claims which follow, "linearly combining" refers to additive or subtractive combining of signals.

What is claimed is:

1. A comb filter system for video signal, said comb filter system comprising:

a horizontal comb filter and a vertical comb filter, each receptive of said video signal, said horizontal comb filter providing a horizontal comb filter response to said video signal which horizontal comb filter response is not vertically comb filtered, and said vertical comb filter providing a vertical comb filter response to said video signal which vertical comb filter response is not horizontally comb filtered;

combining means for combining in an output signal from said combining means said horizontal comb filter response which is not vertically comb filtered and said vertical comb filter response which is not horizontally comb filtered;

edge detector means also receptive of said video signal for generating a respective response thereto, and proportioning means, receptive of the response of said edge detector means and having an output coupled to said combining means, for responding to change in the response of said edge detector means in a first sense for simultaneously increasing the weight of said horizontal comb filter response in the output signal from said combining means and decreasing the weight of said vertical comb filter response in the output signal from said combining means, and for responding to change in the response of said edge detector means in a second sense opposite to said first sense for simultaneously decreasing the weight of said horizontal comb filter response in the output signal from said combining means and increasing the weight of said vertical comb filter response in the output signal from said combining means, thereby to alter over a range of values more than two the proportions of the responses to said horizontal comb filter response and said vertical comb filter response in the output signal from said combining means, said range of values including a value wherein the weights of said horizontal comb filter response and said vertical comb filter response in the output signal from said combining means are substantially similar.

2. A comb filter system for video signal as set forth in claim 1, wherein said proportioning means includes a read-only memory storing a look-up table.

3. A comb filter system as defined in claim 1 wherein said edge detector means includes a plurality of edge detectors operating at a plurality of different angles.

4. The combination as defined in claim 1 wherein said edge detector means includes at least two edge detectors operating at right angles to each other.

5. The combination as defined in claim 1 wherein said edge detector means includes a horizontal scan edge detector and a vertical scan edge detector.

6. The combination as defined in claim 5 wherein the detection of an edge during a horizontal scan causes the proportioning means to increase the proportion of the vertical comb filter output in the output of said combining means.

7. The combination as defined in claim 6 wherein the detection of an edge during a vertical scan causes the proportioning means to increase the proportion of the horizontal comb filter output in the output of said combining means.

8. The combination as defined in claim 7 wherein said video signal is an unfolded video signal in the playback portion of a video cassette recorder.

9. A comb filter system for video signal, said comb filter system comprising:

a network of delay devices connected to receive said video signal, said network having connection points therein for supplying said video signal with various delays corresponding with a rectangular array of nine pixels arranged in rows of points a, b, c; d, e, f; and g, h, i; and arranged in columns of points a, d, g; b, e, h; and c, f, i;

a horizontal comb filter combining signals from points d, e, and f;

a vertical comb filter combining signals from points b, e and h;

means to combine the outputs of said horizontal and vertical comb filters;

a horizontal scan edge detector responding to signals at points a, d, and g and to signals at points c, f, and i;

a vertical scan edge detector responding to signals at points a, b and c and to signals at points g, h and i;

means responsive to the detection of an edge by said horizontal scan edge detector to block the output of said horizontal comb filter; and means responsive to the detection of an edge by said vertical scan edge detector to block the output of said vertical comb filter.

10. The combination as defined in claim 9, wherein said horizontal edge detector is also responsive to signals at points b, e and h, and said vertical edge detector is also responsive to signals at points d, e and f, whereby to detect sharper, higher frequency edges.

11. A comb filter system for a video signal, said comb filter system comprising:

a network of delay devices receptive to said video signal, said network having connection points therein for supplying variously delayed signals corresponding with a rectangular array of pixels arranged in rows of points a, b, c; d, e, f; and g, h, i; and in columns of points a, d, g; b, e, h; and c, f, i;

a first horizontal comb filter combining signals at points d, e and f with weights of $\frac{1}{4}$, $\frac{1}{2}$ and $\frac{1}{4}$, respectively, to generate a first horizontal comb filter output response;

a first vertical comb filter combining signals at points b, e and h with weights of $\frac{1}{4}$, $\frac{1}{2}$ and $\frac{1}{4}$, respectively, to generate a first vertical comb filter output response; and means for generating a weighted summation of said first horizontal comb filter response and said first vertical comb filter output response, said means including a first multiplier for multiplying the output of said horizontal filter by a first adjustable weight, the value of which is adjustable over a continuous range of respective values including zero, thereby to generate a first product signal;

a second multiplier for multiplying the output of said vertical filter by a second adjustable weight, the value of which is adjustable over a respective continuous range of values including zero, thereby to generate a second product signal; and means for linearly combining said first and second product signals to generate an output signal for said comb filter system.

12. An edge detector system for a video signal, comprising:

a network of delay devices connected to receive said video signal, said network having connection points therein for supplying said video signal with various delays corresponding with a rectangular array of nine pixels arranged in rows of points a, b, c; d, e, f; and g, h, i; and in columns of points a, d, g; b, e, h; and c, f, i; and a horizontal scan edge detector having first combining means for signals at points a, d and g with weights of $\frac{1}{4}$, $\frac{1}{2}$ and $\frac{1}{4}$, respectively; having second combining means for signals at points c, f and i with weights of $\frac{1}{4}$, $\frac{1}{2}$, and $\frac{1}{4}$, respectively; and having a first subtractor for subtracting the outputs of said first and second combining means, one from the other, to generate the response of said horizontal scan edge detector.

13. An edge detector system as set forth in claim 12 further comprising:

a vertical scan edge detector having third combining means for signals at points a, b and c with weights of $\frac{1}{4}$, $\frac{1}{2}$, and $\frac{1}{4}$, respectively; having fourth combining means for signals at points g, h and i with weights of $\frac{1}{4}$, $\frac{1}{2}$ and $\frac{1}{4}$, respectively; and having a second subtractor for subtracting the outputs of said third and fourth combining means, one from the other, to generate the response of said vertical scan edge detector.

14. A video signal processing system for processing a modulated video signal that is of the type formed by modulating an unfolding carrier wave with a folded-spectrum video signal, which modulated video signal at least at times has accompanying unwanted modulating carrier and sideband components;

first edge detector means, responding only to wanted portions of said modulated video signal other than said accompanying unwanted modulating carrier and sideband components, for generating a first edge detector response signal manifesting a first set of detected edges in those wanted portions of said modulated video signal, which first set of detected edges each traverse a first direction of scan;

second edge detector means, responding only to wanted portions of said modulated video signal other than said accompanying unwanted modulating carrier and sideband components, for generating a second edge detector response signal manifesting a second set of detected edges in those wanted portions of said modulated video signal, which second set of detected edges each traverse a second direction of scan perpendicular to said first direction of scan, said detected edges which are not parallel to either said first or second directions of scan being included in both said first and second sets of detected edges;

comb filter means, for combing from said modulated video signal a first comb-filter-response signal having a first prescribed spatial frequency spectrum extending in said first direction of scan, and for combing from said modulated video signal a second comb-filter-response signal having a second prescribed spatial frequency spectrum extending in said second direction of scan; and means, combining said first and second comb-filter-response signals in proportions responsive to the difference between said first edge detector response signal and said second edge detector response signal, for generating a combined comb-filter-response signal.

15. A video signal processing system comprising:

a first detector for detecting the amplitudes of edges in said video signal that cross a first spatial axis and a second detector for detecting the amplitudes of edges in said video signal that cross a second spatial axis orthogonal to said first spatial axis;

a first comb filter for combing signal frequency components of said video signal that have edges that cross said first spatial axis, thereby to generate a first comb filter response;

a second comb filter for combing signal frequency components of said video signal that the edges that cross said second spatial axis, thereby to generate a second comb filter response; and means for linearly combining said first and second comb filter responses as respective components of an output signal for said video signal processing system, said means for linearly combining including means for increasing the ratio of said second comb filter response to said first comb filter response as respective components of the output signal for said video signal processing system only when the amplitude of an edge in said video signal that crosses said first spatial axis as detected by said first detector is determined to be larger than the amplitude of an edge in said video signal that crosses said second spatial axis as detected by said second detector, and means for increasing the ratio of said first comb filter response to said second comb filter response as respective components of the output signal for said video signal processing system only when the amplitude of an edge in said video signal that crosses said second spatial axis as detected by said second detector is determined to be larger than the amplitude of an edge in said video signal that crosses said first spatial axis as detected by said first detector.

16. A video signal processing system comprising:

detector means for generating a signal manifesting detected edges in the video signal, which said detector means includes a first detector for detecting edges in said video signal along a first axis, a second detector for detecting edges along a second axis, and filter means for detecting a false edge signal along either of said first and second axes;

comb filter means for generating a comb filter response, including a first comb filter for combing signal frequency components of a given frequency spectrum along said first axis to generate a first component of said comb filter response, a second comb filter for combing signal frequency components of a given frequency spectrum along said second axis to generate a second component of said comb filter response, and means responsive to said detector signal for altering of the proportions of said first and second components in said comb filter response as a function of said detected signal; and means responsive to said false signal detecting means for suppressing the altering of the ratio between said first and second components in said comb filter response.

17. A comb filter system as set forth in claim 5, wherein said proportioning means includes a read-only memory storing a look-up table.

18. A comb filter system as set forth in claim 17 wherein the detection by said horizontal scan edge detector of an edge occurring in a horizontal scan direction causes the proportioning means to increase the proportion of the vertical comb filter response relative to the horizontal comb filter response in the output signal from said combining means.

19. A comb filter system as set forth in claim 18 wherein the detection by said vertical scan edge detector of an edge occuring in a vertical scan direction causes the proportioning means to increase the proportion of the horizontal comb filter output relative to the vertical comb filter output in the output of said combining means.

20. A comb filter system as set forth in claim 11, further comprising:

a second horizontal comb filter combining signals at points a, b and c with weights of $\frac{1}{4}$, $\frac{1}{2}$ and $\frac{1}{4}$, respectively, to generate a second horizontal comb filter output response;

a third horizontal comb filter combining signals at points g, h and i with weights of $\frac{1}{4}$, $\frac{1}{2}$ and $\frac{1}{4}$, respectively, to generate a third horizontal comb filter output response;

means responding differentially to said second and third horizontal comb filter output responses for generating a vertical scan edge detector response.

21. A comb filter system as set forth in claim 11, further comprising:

a second horizontal comb filter combining signals at points a, b and c with weights of $\frac{1}{4}$, $\frac{1}{2}$ and $\frac{1}{4}$, respectively, to generate a second horizontal comb filter output response;

a third horizontal comb filter combining signals at points g, h and i with weights of $\frac{1}{4}$, $\frac{1}{2}$ and $\frac{1}{4}$, respectively, to generate a third horizontal comb filter output response;

means combining said first, second and third horizontal comb filter output responses with respective weights in $\frac{1}{2}:(-\frac{1}{4}):(-\frac{1}{4})$ ratio, for generating a vertical scan edge detector response.

22. A comb filter system as set forth in claim 11, further comprising:

a second vertical comb filter combining signals at points a, d and g with weights of $\frac{1}{4}$, $\frac{1}{2}$ and $\frac{1}{4}$, respectively, to generate a second vertical comb filter output response;

a third vertical comb filter combining signals at points c, f and i with weights of $\frac{1}{4}$, $\frac{1}{2}$ and $\frac{1}{4}$, respectively, to generate a third vertical comb filter output response; and means responding differentially to said second and third vertical comb filter output responses for generating a horizontal scan edge detector response.

23. A comb filter system as set forth in claim 22 further comprising:

a second horizontal comb filter combining signals at points a, b and c with weights of $\frac{1}{4}$, $\frac{1}{2}$ and $\frac{1}{4}$, respectively, to generate a second horizontal comb filter output response;

a third horizontal comb filter combining signals at points g, h and i with weights of $\frac{1}{4}$, $\frac{1}{2}$ and $\frac{1}{4}$, respectively, to generate a third horizontal comb filter output response;

means for generating a vertical scan edge detector response, by combining the horizontal comb filter output responses of at least said second and third horizontal comb filters;

means for determining the relative strengths of said horizontal scan edge detector response and said vertical scan edge detector response; and means for adjusting said first and said second adjustable weights in response to the relative strengths of said horizontal scan edge detector response and said vertical scan edge detector response.

24. A comb filter system as set forth in claim 23; wherein said means for determining the relative strengths of said horizontal scan edge detector response and said vertical scan edge detector response includes
- a first rectifier rectifying said horizontal scan edge detector response to generate a first rectifier response indicative of the strength of said horizontal scan edge detector response,
- a second rectifier rectifying said vertical scan edge detector response to generate a second rectifier response indicative of the strength of said vertical scan edge detector response, and
- means for generating a differential response to said first rectifier response and said second rectifier response indicative of the relative strengths of said horizontal scan edge detector response and said vertical scan edge detector response; and wherein said means for adjusting said first and said second adjustable weights in response to the relative strengths of said horizontal scan edge detector response and said vertical scan edge detector response includes
- a read-only memory addressed by said differential response to said first rectifier response and said second rectifier response for reading out the value of one of said first and said second adjustable weights, and
- means for subtracting the read-out value of said one of said first and said second adjustable weights from a constant value for determining the value of another of said first and said second adjustable weights.

25. A comb filter system as set forth in claim 24 wherein said means for generating a vertical scan edge detector response essentially consists of:
- means responding differentially to said second and third horizontal comb filter output responses for generating said vertical scan edge detector response.

26. A comb filter system as set forth in claim 23 wherein said means for generating a vertical scan edge detector response essentially consists of:
- means responding differentially to said second and third horizontal comb filter output responses for generating said vertical scan edge detector response.

27. A comb filter system as set forth in claim 11, further comprising:
- a second vertical comb filter combining signals at points a, d and g with weights of $\frac{1}{4}$, $\frac{1}{2}$ and $\frac{1}{4}$, respectively, to generate a second vertical comb filter output response;
- a third vertical comb filter combining signals at points c, f and i with weights of $\frac{1}{4}$, $\frac{1}{2}$ and $\frac{1}{4}$, respectively, to generate a third vertical comb filter output response; and
- means combining said first, second and third vertical comb filter output responses with respective weights in $\frac{1}{2}:(-\frac{1}{4}):(-\frac{1}{4})$ ratio, for generating a horizontal scan edge detector response.

28. A comb filter system as set forth in claim 27 further comprising:
- a second horizontal comb filter combining signals at points a, b and c with weights of $\frac{1}{4}$, $\frac{1}{2}$ and $\frac{1}{4}$, respectively, to generate a second horizontal comb filter output response;
- a third horizontal comb filter combining signals at points g, h and i with weights of $\frac{1}{4}$, $\frac{1}{2}$ and $\frac{1}{4}$, respectively, to generate a third horizontal comb filter output response;
- means for generating a vertical scan edge detector response, by combining the horizontal comb filter output responses of at least said second and third horizontal comb filters;
- means for determining the relative strengths of said horizontal scan edge detector response and said vertical scan edge detector response; and
- means for adjusting said first and said second adjustable weights in response to the relative strengths of said horizontal scan edge detector response and said vertical scan edge detector response.

29. A comb filter system as set forth in claim 28; wherein said means for determining the relative strengths of said horizontal scan edge detector response and said vertical scan edge detector response includes
- a first rectifier rectifying said horizontal scan edge detector response to generate a first rectifier response indicative of the strength of said horizontal scan edge detector response,
- a second rectifier rectifying said vertical scan edge detector response to generate a second rectifier response indicative of the strength of said vertical scan edge detector response, and
- means for generating a differential response to said first rectifier response and said second rectifier response indicative of the relative strengths of said horizontal scan edge detector response and said vertical scan edge detector response; and wherein said means for adjusting said first and said second adjustable weights in response to the relative strengths of said horizontal scan edge detector response and said vertical scan edge detector response includes
- a read-only memory addressed by said differential response to said first rectifier response and said second rectifier response for reading out the value of one of said first and said second adjustable weights, and
- means for subtracting the read-out value of said one of said first and said second adjustable weights from a constant value for determining the value of another of said first and said second adjustable weights.

30. A comb filter system as set forth in claim 29 wherein said means for generating a vertical scan edge detector response comprises:
- means combining said first, second and third horizontal comb filter output responses with respective weights in $\frac{1}{2}:(-\frac{1}{4}):(-\frac{1}{4})$ ratio, for generating said vertical scan edge detector response.

31. A comb filter system as set forth in claim 28 wherein said means for generating a vertical scan edge detector response comprises:
- means combining said first second and third horizontal comb filter output responses with respective weights in $\frac{1}{2}:(-\frac{1}{4}):(-\frac{1}{4})$ ratio, for generating said vertical scan edge detector response.

32. An edge detector system as set forth in claim 12 wherein said delay network is connected to receive the result of modulating a carrier wave with a folded-spectrum video signal as said video signal, which result has at least at times the remnants of the folded spectral portion therein, to which remnants said edge detector system is essentially non-responsive.

33. An edge detector system as set forth in claim 13, further comprising:
   means for generating a first rectified response, responsive to the amplitude of the response of said horizontal scan edge detector; and
   means for generating a second rectified response, responsive to the amplitude of the response of said vertical scan edge detector.

34. An edge detector system as set forth in claim 33, further comprising:
   means for comparing the amplitudes of said first and second rectified responses.

35. An edge detector system for a video signal, comprising:
   a network of delay devices connected to receive said video signal, said network having connection points therein for supplying said video signal with various delays corresponding with a rectangular array of nine pixels arranged in rows of points a, b, c; d, e, f; and g, h, i; and in columns of points a, d, g; b, e, h; and c, f, i; and
   a vertical scan edge detector having first combining means for signals at points a, b and c with weights of $\frac{1}{4}$, $\frac{1}{2}$, and $\frac{1}{4}$, respectively; having second combining means for signals at points g, h and i with weights of $\frac{1}{4}$, $\frac{1}{2}$ and $\frac{1}{4}$, respectively; and having a subtractor for subtracting the outputs of said first and second combining means, one from the other.

36. An edge detector system as set forth in claim 35 wherein said delay network is connected to receive the result of modulating a carrier wave with a folded-spectrum video signal as said video signal, which result has at least at times the remnants of the folded spectral portion therein, to which remnants said edge detector system is essentially non-responsive.

37. An edge detector system for a video signal, comprising:
   a network of delay devices connected to receive said video signal, said network having connection points therein for supplying said video signal with various delays corresponding with a rectangular array of nine pixels arranged in rows of points a, b, c; d, e, f; and g, h, i; and in columns of points a, d, g; b, e, h; and c, f, i; and
   a horizontal scan edge detector having first combining means for signals at points a, d and g with weights of $\frac{1}{4}$, $\frac{1}{2}$ and $\frac{1}{4}$, respectively; having second combining means for signals at points b, e and h with weights of $\frac{1}{4}$, $\frac{1}{2}$, and $\frac{1}{4}$, respectively; having third combining means for signals at points c, f and i with weights of $\frac{1}{4}$, $\frac{1}{2}$, and $\frac{1}{4}$, respectively; and having fourth combining means for combining the responses of said first second and third combining means in $(-\frac{1}{4}):(\frac{1}{2}):(-\frac{1}{4})$ ratio to generate the response of said horizontal scan edge detector.

38. An edge detector system as set forth in claim 37 wherein said delay network is connected to receive the result of modulating a carrier wave with a folded-spectrum video signal as said video signal, which result has at least at times the remnants of the folded spectral portion therein, to which remnants said edge detector system is essentially non-responsive.

39. An edge detector system as set forth in claim 37 further comprising:
   a vertical scan edge detector having fifth combining means for signals at points a, b and c with weights of $\frac{1}{4}$, $\frac{1}{2}$, and $\frac{1}{4}$, respectively; having sixth combining means for signals at points d, e and f with weights of $\frac{1}{4}$, $\frac{1}{2}$, and $\frac{1}{4}$, respectively; having seventh combining means for signals at points g, h and i with weights of $\frac{1}{4}$, $\frac{1}{2}$ and $\frac{1}{4}$, respectively; and having eighth combining means for combining the responses of said fifth, sixth and seventh combining means in $(-\frac{1}{4}):(\frac{1}{2}):(-\frac{1}{4})$ ratio to generate the response of said vertical scan edge detector.

40. An edge detector system as set forth in claim 39, further comprising:
   means for generating a first rectified response, responsive to the amplitude of the response of said horizontal scan edge detector; and
   means for generating a second rectified response, responsive to the amplitude of the response of said vertical scan edge detector.

41. An edge detector system as set forth in claim 40, further comprising:
   means for comparing the amplitudes of said first and second rectified responses.

42. An edge detector system for a video signal, comprising:
   a network of delay devices connected to receive said video signal, said network having connection points therein for supplying said video signal with various delays corresponding with a rectangular array of nine pixels arranged in rows of points a, b, c; d, e, f; and g, h, i; and in columns of points a, d, g; b, e, h; and c, f, i; and
   a vertical scan edge detector having first combining means for signals at points a, b and c with weights of $\frac{1}{4}$, $\frac{1}{2}$, and $\frac{1}{4}$, respectively; having second combining means for signals at points d, e and f with weights of $\frac{1}{4}$, $\frac{1}{2}$, and $\frac{1}{4}$, respectively; having third combining means for signals at points g, h and i with weights of $\frac{1}{4}$, $\frac{1}{2}$ and $\frac{1}{4}$, respectively; and having fourth combining means for combining the responses of said first, second and third combining means in $(-\frac{1}{4}):(\frac{1}{2}):(-\frac{1}{4})$ ratio to generate the response of said vertical scan edge detector.

43. An edge detector system as set forth in claim 42 wherein said delay network is connected to receive the result of modulating a carrier wave with a folded-spectrum video signal as said video signal, which result has at least at times the remnants of the folded spectral portion therein, to which remnants said edge detector system is essentially non-responsive.

44. An edge detector system for a video signal, comprising:
   a network of delay devices connected to receive said video signal, said network having connection points therein for supplying said video signal with various delays corresponding with a rectangular array of nine pixels arranged in rows of points a, b, c; d, e, f; and g, h, i; and in columns of points a, d, g; b, e, h; and c, f, i; and
   a horizontal scan edge detector combining signals at points a, c, d, f, g and i with weights in $(\frac{1}{4}):(-\frac{1}{4}):(\frac{1}{2}):(-\frac{1}{2}):(\frac{1}{4}):(-\frac{1}{4})$ ratio for generating its response.

45. An edge detector system as set forth in claim 44 wherein said delay network is connected to receive the result of modulating a carrier wave with a folded-spectrum video signal as said video signal, which result has at least at times the remnants of the folded spectral portion therein, to which remnants said edge detector system is essentially non-responsive.

46. An edge detector system as set forth in claim 45, further comprising:
   a vertical scan edge detector combining signals at points a, b, c, g, h and i with weights in ($\frac{1}{4}$):($\frac{1}{2}$):($\frac{1}{4}$):($-\frac{1}{4}$):($-\frac{1}{2}$):($-\frac{1}{4}$) ratio for generating its response.

47. An edge detector system as set forth in claim 46, further comprising:
   means for generating a first rectified response, responsive to the amplitude of the response of said horizontal scan edge detector; and
   means for generating a second rectified response, responsive to the amplitude of the response of said vertical scan edge detector.

48. An edge detector system as set forth in claim 47, further comprising:
   means for comparing the amplitudes of said first and second rectified responses.

49. An edge detector system for a video signal, comprising:
   a network of delay devices connected to receive said video signal, said network having connection points therein for supplying said video signal with various delays corresponding with a rectangular array of nine pixels arranged in rows of points a, b, c; d, e, f; and g, h, i; and in columns of points a, d, g; b, e, h; and c, f, i; and
   a vertical scan edge detector combining signals at points a, b, c, g, h and i with weights in ($\frac{1}{4}$):($\frac{1}{2}$):($\frac{1}{4}$):($-\frac{1}{4}$):($-\frac{1}{2}$):($-\frac{1}{4}$) ratio for generating its response.

50. An edge detector system as set forth in claim 49 wherein said delay network is connected to receive the result of modulating a carrier wave with a folded-spectrum video signal as said video signal, which result has at least at times the remnants of the folded spectral portion therein, to which remnants said edge detector system is essentially non-responsive.

51. An edge detector system for a video signal, comprising:
   a network of delay devices connected to receive said video signal, said network having connection points therein for supplying said video signal with various delays corresponding with a rectangular array of nine pixels arranged in rows of points a, b, c; d, e, f; and g, h, i; and in columns of points a, d, g; b, e, h; and c, f, i; and
   a horizontal scan edge detector combining signals at points a, b, c, d, e, f, g, h and i with weights in
   ($-1/16$):($\frac{1}{8}$):($-1/16$):($-\frac{1}{8}$):($\frac{1}{4}$):($-\frac{1}{8}$):($-1/16$):($\frac{1}{8}$):($-1/16$) ratio for generating its response.

52. An edge detector system as set forth in claim 51 wherein said delay network is connected to receive the result of modulating a carrier wave with a folded-spectrum video signal as said video signal, which result has at least at times the remnants of the folded spectral portion therein, to which remnants said edge detector system is essentially non-responsive.

53. An edge detector system as set forth in claim 51 further comprising:
   a vertical scan edge detector combining signals at points a, b, c, d, e, f, g, h and i with weights in ($-1/16$):($-\frac{1}{8}$):($-1/16$):($\frac{1}{8}$):($\frac{1}{4}$):($\frac{1}{8}$):($-1/16$):($-\frac{1}{8}$):($-1/16$) ratio for generating its response.

54. An edge detector system as set forth in claim 53, further comprising:
   means for generating a first rectified response, responsive to the amplitude of the response of said horizontal scan edge detector; and
   means for generating a second rectified response, responsive to the amplitude of the response of said vertical scan edge detector.

55. An edge detector system as set forth in claim 54, further comprising:
   means for comparing the amplitudes of said first and second rectified responses.

56. An edge detector system for a video signal, comprising:
   a network of delay devices connected to receive said video signal, said network having connection points therein for supplying said video signal with various delays corresponding with a rectangular array of nine pixels arranged in rows of points a, b, c; d, e, f; and g, h, i; and in columns of points a, d, g; b, e, h; and c, f, i; and
   a vertical scan edge detector combining signals at points a, b, c, d, e, f, g, h and i with weights in ($-1/16$):($-\frac{1}{8}$):($-1/16$):($\frac{1}{8}$):($\frac{1}{4}$):($\frac{1}{8}$): ($-1/16$):($-\frac{1}{8}$):($-1/16$) ratio for generating its response.

57. An edge detector system as set forth in claim 56 wherein said delay network is connected to receive the result of modulating a carrier wave with a folded-spectrum video signal as said video signal, which result has at least at times the remnants of the folded spectral portion therein, to which remnants said edge detector system is essentially non-responsive.

* * * * *